(12) United States Patent
Hill, Jr. et al.

(10) Patent No.: US 6,991,707 B2
(45) Date of Patent: Jan. 31, 2006

(54) POLYMERIC CREPING ADHESIVES AND CREPING METHODS USING SAME

(75) Inventors: Walter B. Hill, Jr., Germantown, TN (US); John B. Stitt, Memphis, TN (US)

(73) Assignee: Buckman Laboratories International, Inc., Memphis, TN (US)

( * ) Notice: Subject to any disclaimer, the term of this patent is extended or adjusted under 35 U.S.C. 154(b) by 120 days.

(21) Appl. No.: 10/162,117

(22) Filed: Jun. 4, 2002

(65) Prior Publication Data

US 2003/0019597 A1    Jan. 30, 2003

Related U.S. Application Data

(60) Provisional application No. 60/295,951, filed on Jun. 5, 2001.

(51) Int. Cl.
*D21F 11/00* (2006.01)

(52) U.S. Cl. .................. 162/111; 162/164.3; 162/164.6

(58) Field of Classification Search ............. 162/164.6, 162/164.3, 111
See application file for complete search history.

(56) References Cited

U.S. PATENT DOCUMENTS

| | | | | |
|---|---|---|---|---|
| 3,640,841 | A | 2/1972 | Winslow et al. | 162/164 |
| 3,738,945 | A | 6/1973 | Panzer et al. | 260/2 BP |
| 3,778,476 | A | 12/1973 | Rembaum et al. | 260/567.6 P |
| 3,874,870 | A | 4/1975 | Green et al. | 71/67 |
| 3,879,257 | A | 4/1975 | Gentile et al. | 162/112 |
| 3,894,946 | A | 7/1975 | Panzer et al. | 210/54 |
| 3,894,947 | A | 7/1975 | Panzer et al. | 210/54 |
| 3,926,716 | A | 12/1975 | Bates | 162/113 |
| 3,930,877 | A | 1/1976 | Aitken | 106/287 |
| 3,931,319 | A | 1/1976 | Green et al. | 260/567.6 P |
| RE28,808 | E | 5/1976 | Panzer et al. | 260/2 BP |
| 4,025,627 | A | 5/1977 | Green et al. | 424/248.4 |
| 4,027,020 | A | 5/1977 | Green et al. | 424/248.56 |
| 4,063,993 | A | 12/1977 | Burns | 156/659 |
| 4,089,977 | A | 5/1978 | Green et al. | 424/329 |
| 4,104,161 | A | 8/1978 | Wein | 210/54 |
| 4,111,679 | A | 9/1978 | Shair et al. | 71/67 |
| 4,147,627 | A | 4/1979 | Goodman | 210/58 |
| 4,164,521 | A | 8/1979 | Goodman | 525/187 |
| 4,166,041 | A | 8/1979 | Goodman | 252/180 |
| 4,300,981 | A | 11/1981 | Carstens | 162/109 |
| 4,304,625 | A | 12/1981 | Grube et al. | 162/111 |
| 4,440,898 | A | 4/1984 | Pomplun et al. | 524/503 |
| 4,501,640 | A | 2/1985 | Soerens | 162/111 |
| 4,506,081 | A | 3/1985 | Fenyes et al. | 548/523 |
| 4,528,316 | A | 7/1985 | Sorens | 524/503 |
| 4,581,058 | A | 4/1986 | Fenyes et al. | 71/67 |
| 4,606,773 | A | 8/1986 | Novak | 106/213 |
| 4,684,439 | A | 8/1987 | Soerens | 162/111 |
| 4,769,155 | A | 9/1988 | Dwyer | 210/728 |
| 4,778,813 | A | 10/1988 | Fenyes et al. | 514/357 |
| 4,788,243 | A | 11/1988 | Soerens | 524/503 |
| 4,883,564 | A | 11/1989 | Chen et al. | 162/112 |
| 4,886,579 | A | 12/1989 | Clark et al. | 162/111 |
| 4,970,211 | A | 11/1990 | Fenyes et al. | 514/252 |
| 4,994,146 | A | 2/1991 | Soerens | 162/112 |
| 5,025,046 | A | 6/1991 | Soerens | 524/72 |
| 5,051,124 | A | 9/1991 | Pera | 71/67 |
| 5,093,078 | A | 3/1992 | Hollis et al. | 422/16 |
| 5,128,100 | A | 7/1992 | Hollis et al. | 422/14 |
| 5,142,002 | A | 8/1992 | Metzner | 525/540 |
| 5,179,150 | A | 1/1993 | Furman, Jr. et al. | 524/376 |
| 5,187,219 | A | 2/1993 | Furman, Jr. | 524/377 |
| 5,234,547 | A | 8/1993 | Knight et al. | 162/111 |
| 5,246,544 | A | 9/1993 | Hollenberg et al. | 162/111 |
| 5,326,434 | A | 7/1994 | Carevic et al. | 162/111 |
| 5,370,773 | A | 12/1994 | Luu et al. | 162/111 |
| 5,374,334 | A | 12/1994 | Sommese et al. | 162/111 |
| 5,382,323 | A | 1/1995 | Furman, Jr. et al. | 162/111 |
| 5,437,766 | A | 8/1995 | Van Phan et al. | 162/127 |
| 5,468,796 | A | 11/1995 | Chen et al. | 524/377 |
| 5,487,813 | A | 1/1996 | Vinson et al. | 162/111 |
| 5,490,903 | A | 2/1996 | Chen et al. | 162/111 |
| 5,633,309 | A | 5/1997 | Warchol et al. | 524/538 |
| 5,660,687 | A * | 8/1997 | Allen et al. | 162/111 |
| 5,846,380 | A | 12/1998 | Van Phan et al. | 162/111 |
| 5,866,016 | A | 2/1999 | Jaquess et al. | 210/764 |
| 5,902,862 | A | 5/1999 | Allen | 525/430 |
| 5,942,085 | A | 8/1999 | Neal et al. | 162/111 |
| 5,944,954 | A | 8/1999 | Vinson et al. | 162/111 |
| 6,207,734 | B1 | 3/2001 | Vinson et al. | 524/47 |

* cited by examiner

*Primary Examiner*—Peter Chin
(74) *Attorney, Agent, or Firm*—Kilyk & Bowersox, P.L.L.C.

(57) ABSTRACT

A method for manufacturing a creped fiber web is provided and includes providing a rotating cylindrical dryer surface, applying an ionene adhesive to the rotating cylindrical dryer surface to form an adhesive dryer surface, conveying a fiber web to the adhesive dryer surface, drying the fiber web on the adhesive dryer surface to form a dried fiber web, and creping the dried fiber web from the adhesive dryer surface. The ionene polymer can be a crosslinked polymer of an alkylamine, a haloepoxyalkane, and an amine that differs from the alkylamine, such as a terpolymer of dimethylamine, epichlorohydrin, and ethylenediamine. The ionene adhesive may further include monoammonium phosphate. The ionene polymer may be water-soluble and cationic.

17 Claims, 4 Drawing Sheets

POLYMERIC CREPING ADHESIVES AND CREPING METHODS USING SAME

This application claims the benefit under 35 U.S.C. §119 (e) of prior U.S. Provisional Patent Application No. 60/295,951, filed Jun. 5, 2001, which is incorporated in its entirety by reference herein.

BACKGROUND OF THE INVENTION

The present invention relates to the manufacture of crepe paper including soft, absorbent tissue paper webs and particularly to the mode of creping of such webs to attain adequate softness and adhesive characteristics in the web while minimizing operational difficulties.

It is known in the art to form a thin paper web from a slurry of water and fiber, dewater the wet web, and then at least partially dry the dewatered web. The web is then conveyed or carried on a fabric to a large steam-heated rotary drum termed in the art a Yankee dryer. The web commonly enters the dryer at a circumferential dryer position which is a major portion around the dryer from the zone of web de-contact from the drum. The de-contact zone is equipped with a creping blade against which the web abuts so as to be pushed backwardly upon itself and attain the well-known tissue crepe paper structure.

The creping action requires that the web be well adhered to the dryer to effect a consistent and uniform creping action, and for example, to prevent flaring of the web from the dryer before or at the exit zone in the vicinity of the creping blade. In some instances the web is presented to the dryer at a considerable moisture content that is typically as high as about 60%. Such webs accordingly have fiber consistencies at the point of contact with the dryer of about 40%. The moisture content, depending upon the condition of the web surface and the Yankee dryer surface, may tend to cause the web to adhere strongly to the dryer throughout the drying action of the rotating drum. Under such circumstances, there is usually no requirement for the use of a supplemental adhesive, and on some occasions the adhesion to the dryer is so tight that a release agent is applied between the dryer and the web to limit the extent of adhesion.

In some modes of operation commonly referred to as through-drying, contact of the web with the dryer surface is limited. In a through-drying operation, the web formed from the slurry of water and fiber is dewatered without significantly pressing the wet web. This is followed by a drying action in a hot air blast. The resulting webs are then pressed to the Yankee dryer using a knuckled fabric so that the web adheres to the dryer in closely spaced zones, with bulking of the web between the zones. Fabrics having as fine a count as 4,900 openings per square inch and above may serve the purpose. The fiber consistency of such webs when presented to the dryer may be from about 30% to about 90% fiber. Higher fiber-consistency webs commonly require an adhesive to adequately secure the web to the dryer for completion of both the drying action and creping action.

A variety of adhesives have been employed for retaining a web on a dryer surface. These include polyvinyl acetate-ethylene copolymer emulsions and aqueous polyvinyl alcohol solutions. It has been found that polyvinyl acetate-ethylene copolymer compositions that may contain small percentages of polyvinyl alcohol such as less than about 5% of the total solids by weight, are generally adequate for the purpose but cause a number of undesirable effects. Polyvinyl alcohol adhesives pose similar problems.

With more specific reference to the polyvinyl acetate-ethylene copolymers, these copolymers tend to be retained on the creped paper web on the side that engages the dryer. When a resulting creped web is rolled or rolled and plied with another web to form a sheet, the surface or surfaces carrying the residual adhesive tends to adhere to the adjacent rolled opposite surface causing blocking in the roll. Such blocking has additional detrimental effects in light-weight tissues where if any minor edge defect or small hole occurs, an effort to separate the blocked plies can result in tear-outs from the web, complete web breakage, and even ply reversal, that is, the attachment of a ply to an adjacent sheet.

Additionally, it has been found that the fabric carrying the web to the dryer may become contaminated with the copolymer that is difficult to remove with conventional cleaning actions, particularly due to the water-resistance of the copolymers.

In contrast to the polyvinyl acetate-ethylene copolymer, polyvinyl alcohols having a significant degree of hydrolysis tend to be water-soluble and also tend to be unaffected by most organic solvents. The polyvinyl alcohols (which may contain some polyvinyl acetate) tend to coat the dryer with a hard and uneven film that builds up as drying and creping proceed, resulting in uneven creping. Additionally, to remove the hard film, a cleaning blade is frequently used against the dryer surface causing dryer surface wear.

These and other problems of the aforementioned systems, methods, and adhesives, are overcome by the creping adhesives, systems, and methods of the present invention.

SUMMARY OF THE INVENTION

The present invention relates to a method for manufacturing a creped fiber web wherein the method includes providing a rotating cylindrical dryer surface, applying an ionene adhesive to the rotating cylindrical dryer surface to form an adhesive dryer surface, conveying a fiber web to the adhesive dryer surface, drying the fiber web on the adhesive dryer surface to form a dried fiber web, and creping the dried fiber web from the adhesive dryer surface. The ionene polymer can be a crosslinked polymer of an alkylamine, a haloepoxyalkane, and an amine that differs from the alkylamine, such as a terpolymer of dimethylamine, epichlorohydrin, and ethylenediamine. The ionene adhesive may further include monoammonium phosphate and is preferably water-soluble and cationic.

All patents and publications mentioned herein are incorporated herein in their entireties by reference.

It is to be understood that both the foregoing general description and the following detailed description are exemplary and explanatory only and are only intended to provide a further explanation of the present invention, as claimed. The accompanying drawings, which are incorporated in and constitute a part of this application, illustrate several exemplary embodiments of the present invention and together with description, serve to explain the principles of the present invention.

BRIEF DESCRIPTION OF THE DRAWINGS

The present invention may be more fully understood with reference to the accompanying figures. The figures are intended to illustrate exemplary embodiments of the present invention without limiting the scope of the invention.

DETAILED DESCRIPTION OF THE PRESENT INVENTION

Figure 1:
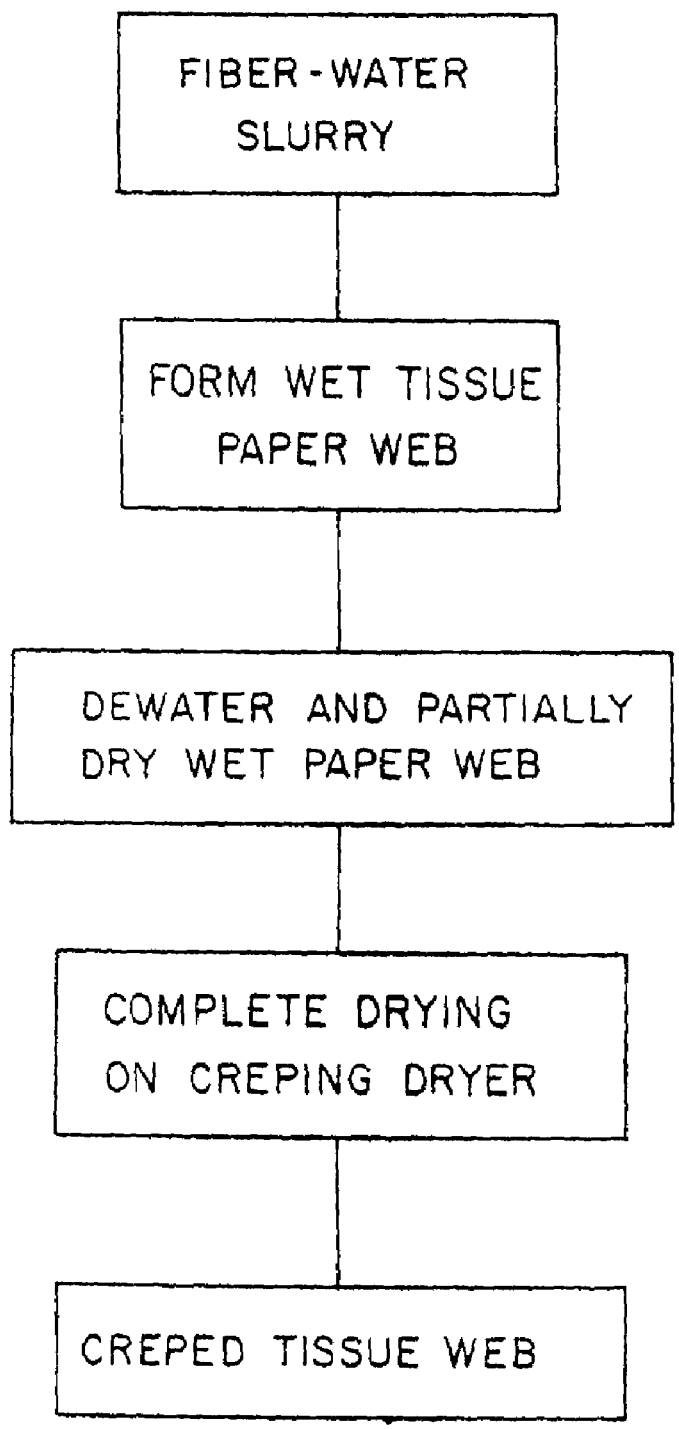
FIG. 1 is a flow chart illustrating a process according to the present invention.

According to the present invention, a method of manufacturing crepe paper, including soft, absorbent tissue paper webs, and particularly to modes of creping of such webs to attain adequate softness and adhesive characteristics while minimizing operational difficulties. According to the present invention, a thin paper web is formed from a slurry of water and fiber using a conventional web forming technique. The web is then dewatered and preferably is at least partially dried. The web is then conveyed, for example, carried on a fabric, to a large preferably steam-heated rotary drum dryer, referred to herein and elsewhere as a Yankee dryer. The web commonly enters the dryer at a circumferential dryer position that is preferably at least about halfway around, and more preferably at least about 75% around, the cylindrical dryer with respect to the zone of web de-contact from the drum. The de-contact zone is equipped with a creping blade against which the web abuts so as to be pushed backwardly upon itself and attain the well-known tissue crepe paper structure. A flow chart illustrating a process according to the present invention is shown in FIG. 1.

The creping action is facilitating by ensuring that the web is well-adhered to the dryer to effect a consistent and uniform creping action, and for example, to prevent flaring of the web from the dryer before or at the exit zone in the vicinity of the creping blade. In some instances the web is presented to the dryer at a considerable moisture content of up to about 90% by weight based on the weight of the web. Webs having moisture contents of from about 10% by weight to about 90% by weight, and more particularly from about 40% by weight to about 60% by weight, can be processed according to the methods of the present invention. Such webs accordingly would have fiber contents making up the additional weight % of the web. The moisture content, depending upon the condition of the web surface and the Yankee dryer surface, may tend to cause the web to adhere strongly to the dryer throughout the drying action of the rotating drum. Under such circumstances, there is usually no requirement for the use of a supplemental adhesive, and on some occasions the adhesion to the dryer is so tight that a release agent such as silicone oil, other oils, surfactants, soaps, shampoos, or conventional additives for creping adhesives or other adhesives, can either be applied between the dryer and the web, or, for example, mixed with the adhesive, to limit the extent of adhesion.

In some modes of operation commonly referred to herein as through-air drying, contact of the web with the dryer surface is limited. In a through-drying operation according to the present invention, the web formed from the slurry of water and fiber is dewatered without significantly pressing the wet web. This is followed by a drying action that includes a hot air blast. The resulting webs are then pressed to the Yankee dryer using a knuckled fabric so that the web adheres to the dryer in closely spaced zones, with bulking of the web between the zones. Fabrics having as fine a count as 4,900 openings per square inch and above may serve the purpose. The fiber consistency of such webs when presented to the dryer may be from about 10% by weight to about 90% by weight fiber.

The adhesives used according to the present invention can be used with through-air drying systems and creping methods, with Yankee dryer systems and methods, and with wet-crepe machines, systems, and methods.

According to the present invention, the ionene polymers or polymeric quaternary ammonium compounds (polyquats), i.e., cationic polymers containing quaternary nitrogens in the polymer backbone (also known as polymeric quats or polyquats), that are useful as the creping adhesive belong to a well-known class of compounds referred to herein as ionene compounds. Exemplary of the polymers of this class are those polymers described in the *Encyclopedia of Polymer Science and Engineering*, Volume 11, from John Wiley & Sons, pages 499–500, which is incorporated herein in its entirety by reference. The biological activity of this class of polymers is also known. See, e.g., A. Rembaum, *Biological Activity of Ionene Polymers*, Applied Polymer Symposium No. 22, 299–317(1973) and O. May, *Polymeric Antimicrobial Agents in Disinfection, Sterilization, and Preservation*, S. Block, Ed., 322–333(Lea & Febiger, Philadelphia, 1991), which are incorporated by reference. Ionene polymers have a variety of uses in aqueous systems such as microbicides, bactericides, and algicides as well as controlling, even preventing, biofilm and slime formation. U.S. Pat. Nos. 3,874,870; 3,931,319; 4,027,020; 4,089,977; 4,111,679; 4,506,081; 4,581,058; 4,778,813; 4,970,211; 5,051,124; 5,093,078; 5,142,002; and 5,128,100, which are incorporated herein in their entireties by reference, give various examples of these polymers, their preparation, and their uses.

Any ionene polymer or mixture of ionene polymers may be used to practice the present invention. Ionene polymers may be classified according to the repeating unit found in the polymer. The repeating unit results from the reactants used to make the ionene polymer. Preferred ionene formulae include those described in U.S. Pat. No. 5,866,016, which is incorporated herein in its entirety by reference.

A first preferred type of ionene polymer comprises the repeating unit of formula I:

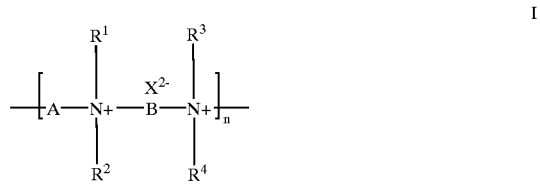

In this formula, $R^1$, $R^2$, $R^3$, and $R^4$ can be identical or different, and are selected from H, $C_1$–$CH_{20}$ alkyl optionally substituted with at least one hydroxyl group, and benzyl optionally substituted on the benzene moiety with at least one $C_1$–$C_{20}$ alkyl group. Preferably, $R^1$, $R^2$, $R^3$ and $R^4$ are all methyl or ethyl.

The group "A" is a divalent radical selected from $C_1$–$C_{10}$ alkylene, $C_2$–$C_{10}$ alkenylene, $C_2$–$C_{10}$ alkynylene, $C_1$–$C_{10}$ hydroxyalkylene, symmetric or asymmetric di-$C_1$–$C_{10}$-alkylenether arylene, arylene-$C_1$–$C_{10}$-alkylene, or $C_1$–$C_{10}$-alkylenearyl-$C_1$–$C_{10}$ alkylene. Preferably, "A" is a divalent $C_1$–$C_5$ alkylene, $C_2$–$C_5$ alkenylene, $C_2$–$C_5$ hydroxyalkylene, symmetric di-$C_2$–$C_5$-alkylenether, and most preferably "A" is —$CH_2CH_2CH_2$—, —$CH_2CH(OH)CH_2$— or —$CH_2CH_2OCH_2CH_2$—.

The group "B" is a divalent radical selected from $C_1$–$C_{10}$ alkylene, $C_2$–$C_{10}$ alkenylene, $C_2C_{10}$ alkynylene, $C_1$–$C_{10}$ hydroxyalkylene, arylene, arylene-$C_1$–$C_{10}$-alkylene, or $C_1$–$C_{10}$-alkylenearyl-$C_1$–$C_{10}$-alkylene. Preferably, "B" is $C_1$–$C_5$ alkylene, $C_2$–$C_5$ alkylene, $C_2$–$C_5$ hydroxyalkylene, arylene, arylene-$C_1$–$C_5$-alkylene, or $C_1$–$C_5$-alkylene. Most preferably "B" is —$CH_2CH_2$—, —$CH_2CH_2CH_2$—, —$CH_2CH_2CH_2CH_2$—, or —$CH_2(CH_2)_4CH_2$—.

The counter ion, $X^{2-}$, is a divalent counter ion, two monovalent counter ions, or a fraction of a polyvalent counter ion sufficient to balance the cationic charge in the repeating unit which forms the ionene polymer backbone. Preferably, $X^{2-}$ is two monovalent anions selected from a halide anion and a trihalide anion and more preferably, chloride or bromide. Ionene polymers having trihalide counter ions are described in U.S. Pat. No. 3,778,476, the disclosure of which is incorporated herein in its entirety by reference.

The ionene polymers having the repeating unit of formula I may be prepared by a number of known methods. One method is to react a diamine of the formula $R^1R^2N$—B—$NR^3R^4$ with a dihalide of the formula X—A—X. Ionene polymers having this repeating unit and methods for their preparation are described, for example, in U.S. Pat. Nos. 3,874,870; 3,931,319; 4,025,627; 4,027,020; 4,506,081; and 5,093,078, the disclosures of which are incorporated herein in their entireties by reference. The biological activity of ionene polymers having the repeating unit of formula I is also described in these patents.

Among the ionene polymers with a repeating unit of formula I, a particularly preferred ionene polymer is polyoxyethylene-(dimethyliminio)ethylene-(dimethyliminio) ethylene dichloride. In this ionene polymer of formula I, $R^1$, $R^2$, $R^3$ and $R^4$ are each methyl, A is —$CH_2CH_2OCH_2CH_2$—, B is —$CH_2CH2$—, and $X^{2-}$ is 2Cl$^-$ and the average molecular weight is 1,000–5,000. This ionene polymer is available from Buckman Laboratories, Inc. of Memphis, Tenn. as BUSAN® 77 product or WSCP® product, which are each 60% aqueous dispersions of the polymer. BUSAN® 77 and WSCP® are biocides used primarily in aqueous systems, including metalworking fluids, for microorganism control.

Another particularly preferred ionene polymer having a repeating unit of formula I is the ionene polymer where $R^1$, $R^2$, $R^3$ and $R^4$ are each methyl, A is —$CH_2CH(OH)CH_2$—, B is —$CH_2CH_2$—, and $X^{2-}$ is 2 Cl$^-$. This ionene polymer is a reaction product of N,N,N', N'-tetramethyl-1,2-ethanediamine with (chloromethyl)-oxirane, and has an average molecular weight of 1,000–5,000. The polymer is available from Buckman Laboratories, Inc. as BUSAN® 79 product and WSCP® II product, which are each 60% aqueous solutions of the polymer.

A second type of ionene polymer comprises the repeating unit of formula II:

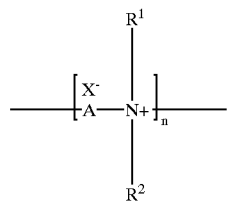

II

In formula II, the definitions of $R^1$, $R^2$, and A are the same as those defined above for formula I. $X^-$ is a monovalent counter ion, one half of a divalent counter ion, or a fraction of a polyvalent counter ion sufficient to balance the cationic charge of the repeating unit which forms the ionene polymer. $X^-$ may be, for example, a halide or trihalide anion, and $X^-$ is preferably chloride or bromide.

The ionene polymers having the repeating unit of formula II may be prepared by known methods. One method is to react an amine of the formula $R^1R^2NH$ with a haloepoxide such as epichlorohydrin. Ionene polymers having the repeating unit of formula II are described, for example, in U.S. Pat. Nos. 4,111,679 and 5,051,124, the disclosures of which are incorporated herein in their entireties by reference. The biological activity of ionene polymers having the repeating unit of formula II is also described in these patents.

Preferred ionene polymers having the repeating unit of formula II are those where $R^1$ and $R^2$ are each methyl, A is —$CH_2CH(OH)CH_2$—, and $X^-$ is Cl$^-$. This polymer is obtained as a reaction product of N-dimethylamine with (chloromethyl)oxirane, and has an average molecular weight of 2,000–10,000. The polymer is available from Buckman Laboratories, Inc, as the BUSANO® 1055 product, a 50% aqueous dispersion of the polymer.

Another preferred ionene polymer having the repeating unit of formula II is obtained as a reaction product of dimethylamine with epichlorohydrin, where $R^1$ and $R^2$ are each methyl, A is —$CH_2CH(OH)CH_2$— and $X^-$ is Cl$^-$. This ionene polymer has a 5,000–10,000 average molecular weight, and is available from Buckman Laboratories, Inc in a 50% aqueous solution as the BUSAN® 1055 product.

A third type of ionene polymer comprises a repeating unit of formula III:

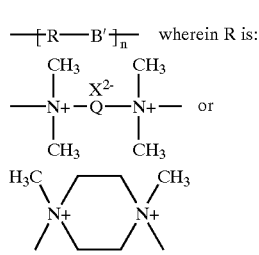

III

The group Q is —(CHR')$_p$—, —$CH_2$—CH=CH—$CH_2$—, —$CH_2$—$CH_2$—O—$CH_2$—$CH_2$—, —$CH_2$—CH(OH) —$CH_2$—, or —(CHR')$_n$—NH—C(O)—NH(CHR')$_n$—. The group B' is {—[$CH_2$—CH(OH)—$CH_2$—N$^+$R'$_2$—(CHR') $_n$—NH—C(O)—NH]—, X$^-$} or {—[(CHR') $_n$—N$^+$R'$_2$—$CH_2$—CH(OH)—$CH_2$]—, X$^-$}. The variables n and p independently vary from 2 to 12. Each R' is independently hydrogen or a $C_1$–$C_{20}$ alkyl group. $X^{2-}$ is a divalent counter ion, two monovalent counter ions, or a fraction of a polyvalent counter ion sufficient to balance the cationic charge in the group R. $X^-$ is a monovalent counter ion, one half of a divalent counter ion or a fraction of a polyvalent counter ion sufficient to balance the cationic charge in the group B'. Preferably, R' is hydrogen or $C_1$–$C_4$ alkyl, n is 2–6, and p is 2–6. Most preferably, R' is hydrogen or methyl, n is 3 and p is 2. Preferred counter ions for $X^{2-}$ and $X^{31}$ are the same as those discussed above for formulae I and II.

The polymers of formula III are derived by known methods from bis-(dialkylaminoalkyl) ureas, which are also known as urea diamines. Ionene polymers of the formula III, methods of their preparation, and their biological activities are described in U.S. Pat. No. 4,506,081, the disclosure of which is incorporated herein in its entirety by reference.

Preferred ionene polymers having the repeating unit of formula III are those where R is urea diamine and B' is $CH_2CH(OH)CH_2$, and $X^-$ is $Cl^-$ Available from Buckman Laboratories, Inc., ASTAT product and BL® 1090 product are 50% aqueous dispersions of this ionene polymer. The ionene polymer is obtained as a reaction product of N,N'-bis-[1-(3-(dimethylamino) -propyl)]urea and epichlorohydrin, such ionene polymer having an average molecular weight of 2,000–15,000, preferably 3,000–7,000.

Ionene polymers comprising the repeating units of formulae I, II, and III may also be cross-linked with primary, secondary or other polyfunctional amines using means known in the art. Ionene polymers can be cross-linked either through the quaternary nitrogen atom or through another functional group attached to the polymer backbone or to a side chain.

Cross-linked ionene polymers, prepared using cross-linking co-reactants, are disclosed in U.S. Pat. No. 3,738,945 and Reissue U.S. Pat. No. 28,808, the disclosures of which are incorporated herein in their entireties by reference. The Reissue Patent describes the cross-linking of ionene polymers prepared by the reaction of dimethylamine and epichlorohydrin. The cross-linking co-reactants listed are ammonia, primary amines, alkylenediamines, polyglycolamines, piperazines, heteroaromatic diamines and aromatic diamines.

U.S. Pat. No. 5,051,124, the disclosure of which is incorporated herein by reference, describes cross-linked ionene polymers resulting from the reaction of dimethylamine, a polyfunctional amine, and epichlorohydrin. U.S. Pat. No. 5,051,124 also describes methods of inhibiting the growth of microorganisms using such cross-linked ionene polymers. Other examples of various cross-linked ionene polymers and their properties are provided in U.S. Pat. Nos. 3,894,946; 3,894,947; 3,930,877; 4,104,161; 4,164,521; 4,147,627; 4,166,041; 4,606,773; and 4,769,155. The disclosures of these patents are incorporated herein in their entireties by reference.

A preferred cross-linked ionene polymer has a repeating unit of formula II, where $R^1$ and $R^2$ are each methyl, A is $-CH_2CH(OH)CH_2-$, $X^-$ is $Cl^-$. The ionene polymer is cross-linked with ammonia. This ionene polymer has a molecular weight of approximately 100,000–500,000, and is available from Buckman Laboratories, Inc. in a 50% aqueous dispersion sold as the BL® 1155 product.

Buckman Laboratories, Inc. products BUSAN® 1099 or BUBOND® 65 are 25% aqueous dispersions of a cross-linked ionene polymer having repeating units of formula II, where $R^1$ and $R^2$ are each methyl, A is $-CH_2CH(OH)CH_2-$, $X^-$ is $Cl^-$, and the cross-linking agent is monomethylamine. This preferred ionene polymer has a molecular weight of approximately 10,000–100,000.

The ionene polymers comprising the repeating units of formulae I, II, or III may also be capped, i.e., have a specific end group. Capping may be achieved by means known in the art. For example, an excess of either reactant used to make the ionene polymer can be employed to provide a capping group. Alternatively, a calculated quantity of a monofunctional tertiary amine or monofunctional substituted or unsubstituted alkyl halide can be reacted with an ionene polymer to obtain a capped ionene polymer. Ionene polymers can be capped at one or both ends. Capped ionene polymers and their microbicidal properties are described in U.S. Pat. Nos. 3,931,319 and 5,093,078, the disclosures of which are incorporated herein in their entireties by reference.

According to an embodiment of the present invention, the ionene polymer adhesive can include at least about 20% by weight and up to about 40% by weight polyalkylamine units, at least about 55% by weight and up to about 75% by weight haloepoxyalkane units, and at least about 1% by weight and up to about 10% by weight alkylenepolyamine units. Preferably, these weight percentages are employed and the polyalkylamine is dimethylamine, the haloepoxyalkane is epichlorohydrin, and the alkylenepolyamine is ethylenediamine.

According to a preferred embodiment of the present invention, the ionene polymer is a lightly crosslinked terpolymer of dimethylamine (DMA), epichlorohydrin (EPI), and ethylenediamine (EDA). The terpolymer preferably has a ratio of DMA to EPI of from about 1:1 to about 1:3, more preferably from about 1:2 to about 1:2.2. The terpolymer preferably has a ratio of EDA to EPI of from about 1:20 to about 1:40, more preferably from about 1:28 to about 1:34. The terpolymer preferably has a ratio of EDA to DMA of from about 1:10 to about 1:20, more preferably from about 1:13 to about 1:16. The terpolymer may be made by a staged process. During stage 1 of the process, EPI is charged to an aqueous mixture of DMA and EDA. The reaction is very exothermic and cooling with an external heat exchanger and jacket should be used to maintain the process vessel temperature below 150° F. Cooling is discontinued near the end of stage 1 in order to allow the temperature to rise to 170–180° F. Then, 50% sodium hydroxide (NaOH) is charged to adjust the pH within the desired range. Polymerization continues in stage 2a with simultaneous EPI and water charges. After Stage 2a, more 50% NaOH is charged to adjust the pH. In stage 2b EPI is charged in shots. The amount of EPI in each shot decreases as the viscosity increases. When viscosity reaches 450–500 cP, sulfuric acid is charged to adjust the pH to be within the range of from about 5 to about 6. Then, dilution water is charged to adjust the batch to 50% solids content and the product is cooled. After pump-out, a small amount of water is charged and the water is circulated via the pump.

As an exemplary process for making the terpolymer, a 6000-gallon stainless steel process vessel is charged with 10,100 pounds (lbs) of water. Then, 500 lbs of EDA is charged to the vessel, preferably using a vacuum charging technique. Then, 7300 lbs of anhydrous DMA is charged to the vessel at a maximum rate of about 200 lbs/minute, but the charging rate should be halted if the temperature exceeds 140° F. or if the pressure exceeds 20 psig. Next, 14,300 lbs of EPI is charged to the vessel at a rate of 40 lbs/minute or about 25 lbs/minute depending upon temperature. EPI charging should be halted if the temperature exceeds 150° F. For the last 1000 lbs portion of the EPI the vessel temperature should be allowed to reach from about 170° F. to about 180° F. In the next stage, 1000 lbs of 50% sodium hydroxide solution is charged to the vessel at 20 lbs/minute. Then, 1200 lbs of EPI and 10,000 lbs of water are simultaneously charged and respective rates of 13.5 lbs/minute and 100 lbs/minute. Then, 200 lbs of 50% NaOH is charged to the vessel at 20 lbs/minute. Then, up to about 150 additional lbs of EPI can be charged to the vessel to adjust the viscosity to a desired level of from about 450 to 500 cP. Then, 530 lbs of sulfuric acid ($H_2SO_4$) is added at 100 lbs/minute and dilution water addition follows to achieve a scale weight of 50,000 lbs (about 4600 to 5100 lbs of dilution water). PH is then adjusted, if needed, to achieve a level in the range of from about 3 to about 9, more preferably from about 5 to about 6. The resultant terpolymer product in water can then be diluted to a desired concentration.

An exemplary terpolymer which can be made according to such a method is identified by CAS number 42751-79-1.

The ionene adhesive is preferably applied to the dryer surface at a rate, relative to the rate of dryer surface rotation, that provides an adequate amount of adhesive to hold the web during drying yet release the dried web upon completion of drying. Conventional adhesive coverage rates and weights can be used as are known to those skilled in the art. Exemplary application rates of the adhesive on the dryer surface can range from about 10 $mg/m^2$ to as much as 500 $mg/m^2$, or more, for example, from about 50 $mg/m^2$ to about 200 $mg/m^2$, or from about 85 $mg/m^2$ to about 100 $mg/m^2$, based on the solids weight of the adhesive composition. Preferably, the adhesive is continuously applied to the rotating dryer so that an adequate amount of adhesive is always on the dryer surface.

Other teachings of creping systems, methods, and adhesives are described in the following U.S. Pat. Nos. which are incorporated herein in their entireties by reference: 3,640,841; 4,304,625; 4,440,898; 4,788,243; 4,994,146; 5,025,046; 5,187,219; 5,326,434; 5,246,544; 5,370,773; 5,487,813; 5,490,903; 5,633,309; 5,660,687; 5,846,380; 4,300,981; 4,063,995; 4,501,640; 4,528,316; 4,886,579; 5,179,150; 5,234,547; 5,374,334; 5,382,323; 5,468,796; 5,902,862; 5,942,085; 5,944,954; 3,879,257; 4,684,439; 3,926,716; 4,883,564; 5,437,766.

Referring now to the drawings, FIG. 1 is a flow chart showing a series of steps that can be used according to the present invention for the formation of a tissue paper web suitable for use as facial tissue, toilet tissue, sanitary napkin wrappers, and the like. Such webs have a finished basis weight usually in the range of from about 7 to about 40 pounds per 3,000 square feet and are formed from aqueous fiber slurries. In specific applications, such a slurry may have a fiber content by weight of about 0.3% and or higher. The slurry is directed to a conventional Fourdrinier drainage wire to form a fiber web. Dewatering of the fiber web occurs through the wire in a conventional manner and the drained web, having a fiber consistency of preferably from about 20% to about 60% is directed to through-drying equipment. The web exits the through-dryer at a fiber content or consistency of about 80% by weight and is passed to a transfer and impression fabric which carries the web to the creping dryer. Such a transfer fabric can, for example, be characterized by about 78 meshes per inch in the machine direction, 72 meshes per inch in the cross-direction, and impression fabric knuckles can be provided to compact about 20% of the surface of the web on a creping or Yankee dryer. The web is creped from the dryer to form a dried web having a fiber content or consistency of about 95%, and is then wound into rolls.

Figure 2:
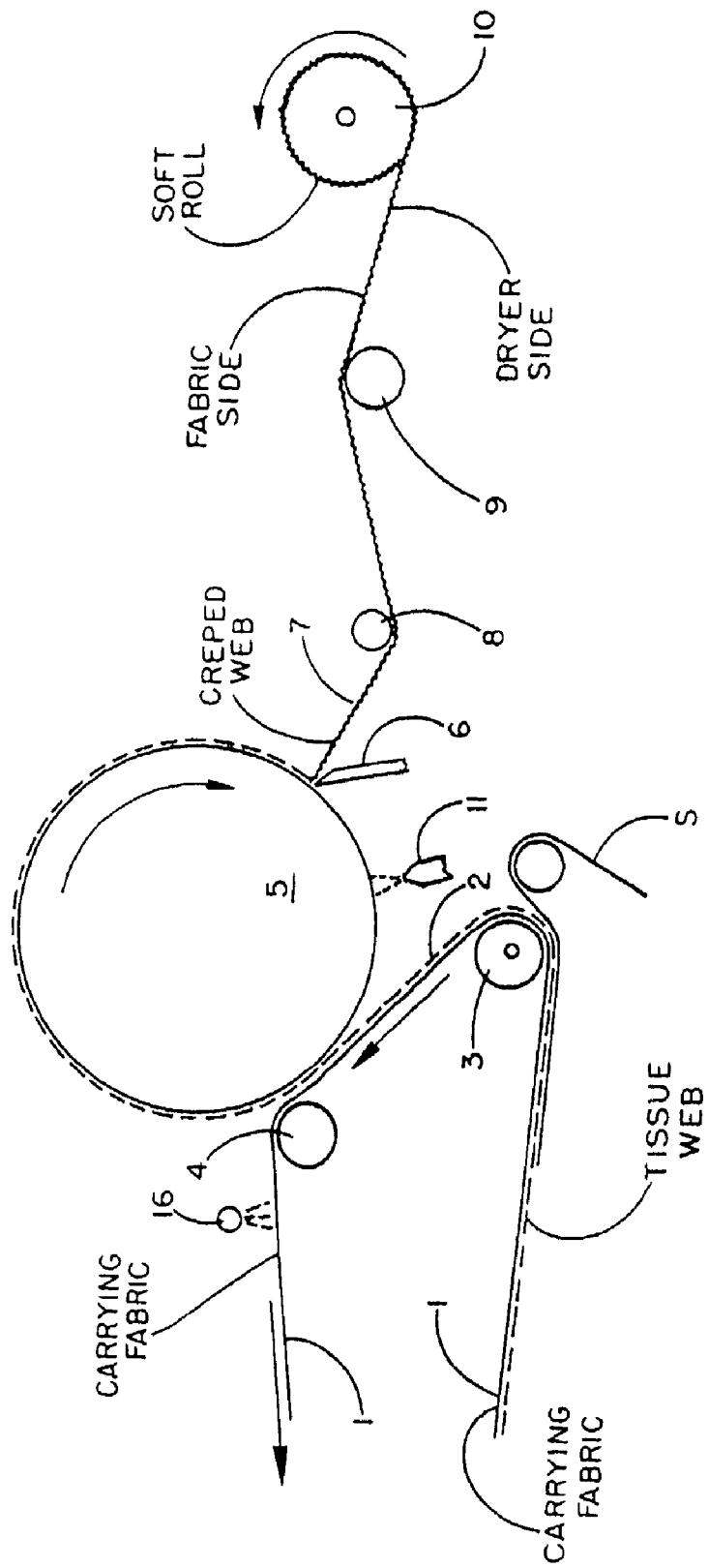
FIG. 2 is a schematic illustration of a creping system that can be used in combination with an ionene polymer creping adhesive formulation according to the present invention.

Referring to FIG. 2, the transfer and impression fabric designated reference numeral 1 carries the formed, dewatered and partially dried web 2 around turning roll 3 to the nip between press roll 4 and Yankee dryer 5. A supplemental lower carrier designated at S may also be employed to carry the web in sandwich fashion, which may be particularly useful under conditions of higher web dryness. The fabric, web, and dryer move in the directions indicated by the arrows. The entry of the web into the dryer is well around the roll from creping blade 6, which, as is schematically indicated, crepes the traveling web from the dryer as indicated at 7. The creped web 7 exiting from the dryer passes over guide and tension rollers 8, 9 and is wound into a soft creped tissue roll 10.

To adhere the relatively dry web 2 (at, for example, 80% fiber consistency) entering the dryer to the surface of the dryer, a spray 11 of adhesive is applied to the surface ahead of the nip between the press roll 4 and Yankee 5. This spray may be applied to the traveling web 2 directly but is preferably directly sprayed onto the dryer to limit the pickup of adhesive by the web and to limit the penetration of adhesive through the web to the carrying fabric.

The spray is preferably aqueous and suitably has a solids content of from about 0.5% by weight to as much as about 70% by weight or more, preferably from about 1% to about 20% solids. For spraying, a range of solids contents of from about 0.75% to about 15% by weight is more preferred although any suitable solids content can be used. For roll coating of the adhesive onto the dryer surface, or knife coating, higher solids contents may be employed, such as from about 1% by weight to about 70% by weight, for example, from about 3% by weight to about 50% by weight.

The ionene adhesives used according to the present invention have more adhesion at higher moistures and at lower temperatures when compared to conventional creping adhesives, especially those used on through-air dryers. The ionene adhesives also fracture at the blade in a unique way, making an excellent crepe structure, even at high sheet moisture contents. The ionene adhesives are also rewettable, in contrast to conventional resin adhesives that are not.

By including a small amount of monoammonium phosphate (MAP) in the adhesive, the adhesive formulation minimizes corrosion that might otherwise be caused by chlorides in or from the ionene polymer.

Experiments demonstrate the superiority of ionenes over conventional standard through-air dryer creping adhesives, particularly over current adhesives that include a combination of polyvinyl alcohol, sorbitol (or sucrose), and release agents (surfactants or oil-based surfactant formulations) used for creping on a through-air dryer system.

Figure 3:
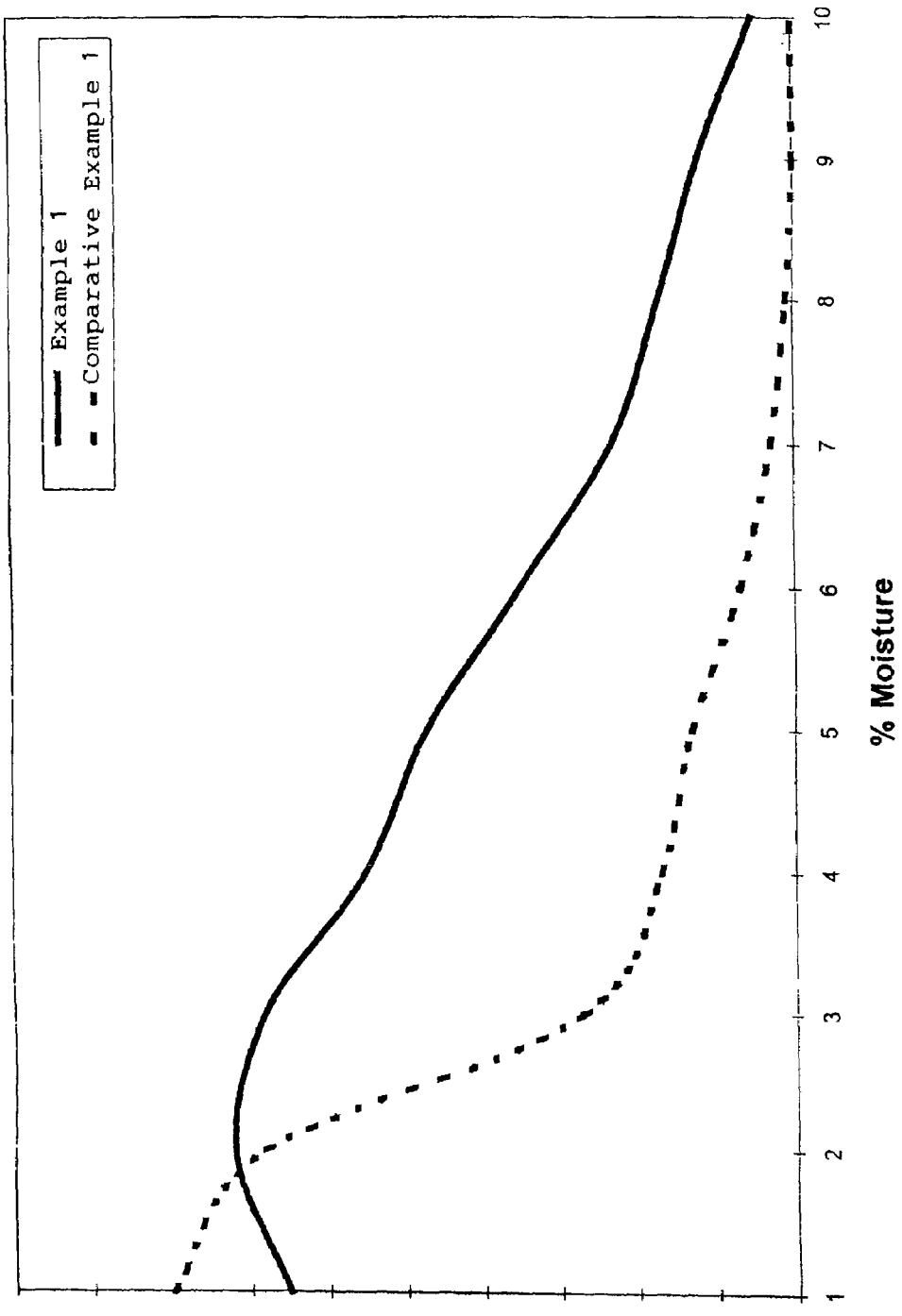
FIG. 3 is a graph showing how an adhesive formulation used according to the present invention (Example 1) retains higher adhesion at higher moisture contents when compared to an existing conventional adhesive formulation (Comparative Example 1)

The adhesives used according to the present invention provide superior creping, and ionenes such as the terpolymer of DMA, EPI and EDA described above fracture nicely at the creping blade, exploding the sheet and increasing creping quality. The adhesives also provide superior adhesion at high moisture contents, and ionene such as the described terpolymer are more adhesive at higher sheet moisture contents as shown in the graph of FIG. 3.

The adhesives used according to the present invention also provide enhanced runnability. Creping with the ionene adhesives enhance operational runnability because ionenes retain their adhesion over wide moisture and temperature ranges. Moisture variability, which can be common across a sheet surface, does not change the creping effectiveness when ionene adhesives are used according to the present invention, thus resulting in a more uniform and higher quality tissue/towel product. Blending the ionenes and polyvinyl alcohol chemistries resulted in little or no sculching and blade chattering while maintaining doctor blade life and blade amps.

Figure 4:
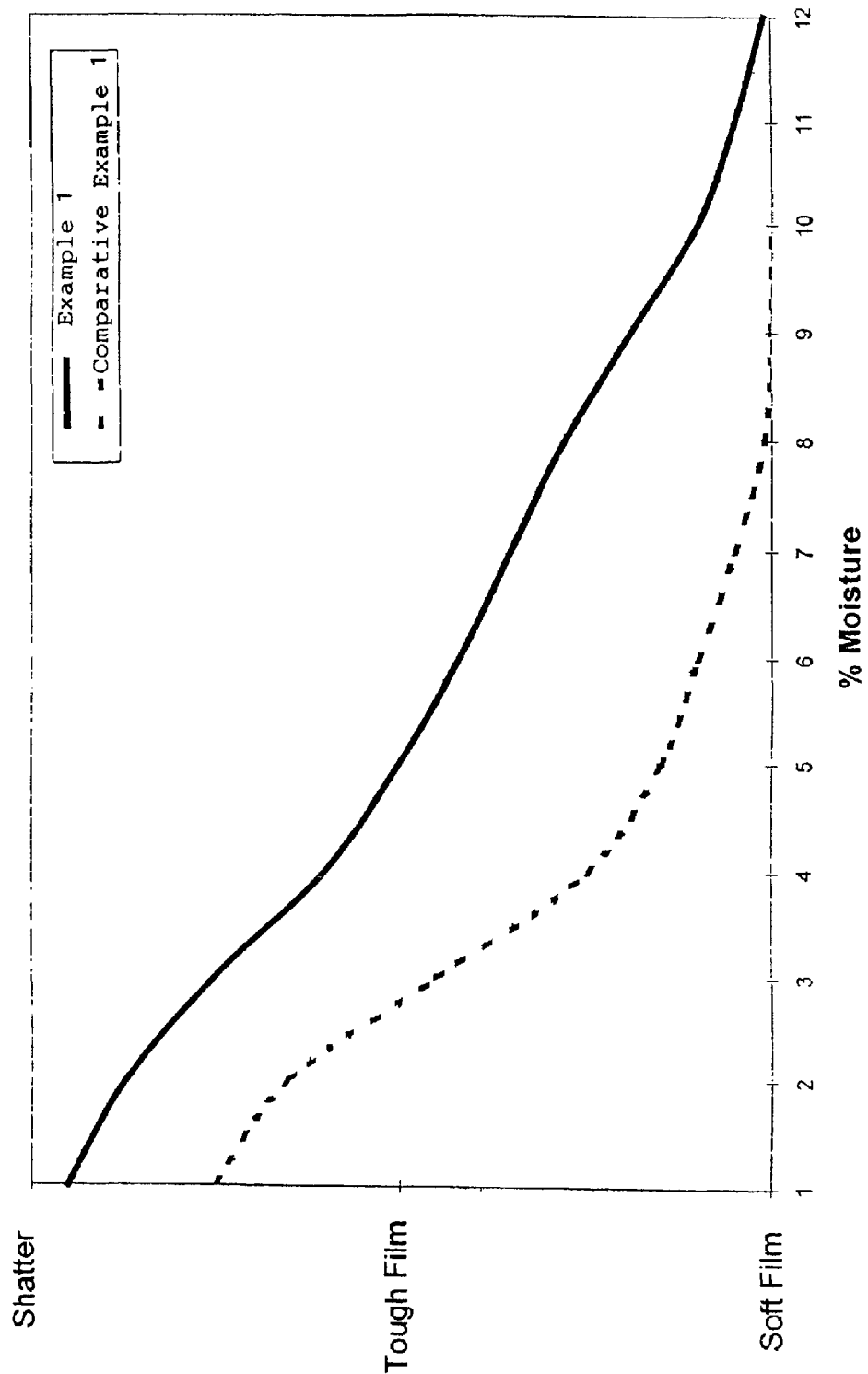
FIG. 4 is a graph showing how an adhesive formulation of the present invention (Example 1) had higher shatter and remained tougher longer when compared to an existing conventional adhesive (Comparative Example 1) that provided a soft film only at moisture contents above 4%.

The adhesives used according to the present invention also provide superior film properties when compared to conventional adhesives. Varying the ratio of ionenes, such as the DMA:EPI:EDA terpolymer, to polyvinylalcohols allows control of film properties such as film toughness and shatter as shown in the graph of FIG. 4.

Creped products produced using the present methods and adhesives of the present invention, and using through-air dryers, results in superior creped tissue and towel products when compared to products made by systems and methods that use conventional adhesives.

The adhesives used according to the present invention are also rewettable as ionenes do not crosslink. The complete rewettability of these adhesives minimizes irreversible felt filling, minimizes deposit formation, and minimizes clean-up time and efforts.

In addition, the ionene adhesives used according to the present invention can be used on enhanced through-air dryer systems, on Yankee dryer systems, and with wet creping systems. The ionenes enhance the creping performance in any type of tissue and towelling process, including through-air dryer processes, Yankee dryer processes, and wet crepe tissue machine processes. Furthermore, creping can be done at high sheet moisture contents, where prior systems using hard resins (like wet strength resins) and soft resins have failed. The present ionene adhesives fill this gap either alone or in combination with existing creping adhesive products, providing excellent adhesion at higher moisture contents.

EXAMPLES

The Examples described and results shown on the attached sheets and in FIGS. 3 and 4 indicate the superiority of an ionene adhesive formulation used according to the present invention over a conventional adhesive formulation.

The results of the comparative tests are shown in Table I below and in the graphs of FIGS. 3 and 4. In the Examples, the Example I formulation included a terpolymer ionene adhesive designated "M", a water-based polyvinylalcohol formulation designated 2076 available from Buckman Laboratories International, Inc., and Busperse 2098, an oil-based release agent also available from Buckman Laboratories International, Inc. The Comparative Example I formulation contained polyvinylalcohol (PVA), Sorbitol, and Triton X-100 (an alkylphenolethoxylate, 100% active). The machines used included a through-air dryer having felt on the cob side, a debunizer on the table, a moisture in content of from 40 to 50%, a moisture out content of 10%, and a 16 foot diameter. Also used was a Yankee dryer which had a vacuum roll, no debunizer, pressure on nozzle of 80 psi, a running speed of from 2000 to 3500 ft/min., a moisture off of from 3% to 3.5%, a temperature at the blade of from 280° F. to 350° F. while the sheet was in a temperature range of from about 200° F. to about 250° F. The PVA was made down to a solids content of about 3.5% by weight and was fed at a feed rate of about 3400 mL/min. The Sorbitol was made down to a solids content of about 5.0% by weight and was fed at a feed rate of about 1400 mL/min. The Triton X-100 was made down to a solids content of about 1.5% by weight and was fed at a feed rate of about 400 mL/min.

Table I shows the total amounts of each component in the adhesive formulations first, for each test number, then shows the solids weight for each component in the adjacent columns for each respective row. The results show that for a through-air dryer system, a three-component coating system of component "M", the component 2076, and the component 2098 provides excellent creping adhesion. The optimum ratio of component "M" to 2076 is shown to be 3:1 on a solids basis, and the effect of changing the ratio was shown as providing a film with more shatter when the amount of "M" is increased, and a film that is softer when the amount of 2076 is increased.

TABLE 1

| Test no | Move no | 0.0 PVA | 5.00% Sorbitol | 0.70% Triton | 5% 2098 | 5% M | PVA | Sorbitol | Triton | 2098 | M | Total q | Comments |
|---|---|---|---|---|---|---|---|---|---|---|---|---|---|
| | | mL | | | | | | | | | | | |
| 1 | 0 | 34.0 | 14 | 8 | 0 | 0.0 | 1.19 | 0.70 | 0.06 | 0.00 | 0.00 | 1.950 | Film forming - med ease to peel with scraper peels up in a roll |
| 2 | 1 | 34.0 | 14 | 0 | 12 | | 1.19 | 0.70 | 0.00 | 0.06 | 0.00 | 1.950 | Film forming - med ease to peel with scraper peels up in a roll |
| 3 | 6 | 15.4 | 7 | 0 | 12 | 20.0 | 0.54 | 0.35 | 0.00 | 00.6 | 1.00 | 1.950 | Thinner film that tears apart easier than above |
| 4 | 10 | 13.7 | 0 | 0 | 12 | 26.2 | 0.48 | 0.00 | 0.00 | 0.06 | 1.41 | 1.950 | Very hard layer - no peeling - well stuck on |
| 5 | 0 | 34.0 | 14 | 0 | 1.2 | 0.0 | 1.19 | 0.70 | 0.00 | 0.08 | 0.00 | 1.950 | same as above |
| 6 | | 22.0 | 9.8 | 0 | 1.2 | 12.0 | 0.80 | 0.49 | 0.00 | 0.06 | 0.60 | 1.952 | Minor film - Some shattering |
| 7 | | 19.1 | 8.4 | 0 | 1.2 | 16.0 | 0.67 | 0.42 | 0.00 | 0.06 | 0.80 | 1.950 | Minor film - Some shattering |
| 8 | | 27.0 | 0 | 0 | 1.2 | 18.9 | 0.95 | 0.00 | 0.00 | 0.06 | 0.95 | 1.950 | Hard Layer - Shattered - well stuck on |

| Test no | Move no | 0.0 PVA | 5.00% Sorbitol | 0.70% Triton | 5% 2098 | 5% M | PVA | Sorbitol | Triton | 2098 | M | Total q | Comments: diluted each sample with 20 mL tap water and only 10 strokes |
|---|---|---|---|---|---|---|---|---|---|---|---|---|---|
| 9 | | 19.0 | 7.0 | 0.00 | 1.8 | 16.0 | 0.67 | 0.40 | 0.00 | 0.09 | 0.80 | 1.950 | similar to 11, 5, and 2 but slightly tackier - no shatter and slightly less filming |
| 10 | | 15.5 | 7 | 0 | 1.2 | 20.0 | 0.54 | 0.35 | 0.00 | 0.06 | 1.00 | 1.953 | similar to 11, 5, and 2 but slightly tackier - no shatter and slightly less filming |
| 11 | | 34.0 | 14 | 0 | 1.2 | 0.0 | 1.19 | 0.70 | 0.00 | 0.06 | 0.00 | 1.950 | same as 5 and 2 |

TABLE 1-continued

| | | 0.0 PVA | 5.00% Sorbitol | 0.70% Triton | 5% 2098 | 5% M | PVA | Sorbitol | Triton | 2098 | M | Total q | | |
|---|---|---|---|---|---|---|---|---|---|---|---|---|---|---|
| 12 | | 15.5 | 7 | 0 | 1.2 | 20.0 | 0.54 | 0.35 | 0.00 | 0.06 | 1.00 | 1.953 | similar to 10 | |
| | | | | | | | | | | | | | Comments: diluted each sample with 20 mL tap water and only 10 strokes | slippery |
| 13 | | 17.4 | 0 | 0 | 1.8 | 25.0 | 0.61 | 0.00 | 0.00 | 0.09 | 1.25 | 1.949 | med. film - I like this one - not as hard of a coating and film starts to shatter when dry | med |
| 14 | | 26.6 | 0 | 0 | 1.8 | 18.5 | 0.93 | 0.00 | 0.00 | 0.09 | 0.93 | 1.948 | med. Film like 13 but more aggressive to the metal | med–low |
| 15 | | 34.0 | 14 | 0 | 1.2 | 0.0 | 1.19 | 0.70 | 0.00 | 0.06 | 0.00 | 1.950 | same 11 | most |
| 16 | | 27.0 | 0 | 0 | 1.2 | 18.9 | 0.95 | 0.00 | 0.00 | 0.06 | 0.95 | 1.950 | same as 14 | med–low |

| Test no | Move no | 0.0 PVA | 5.00% Sorbitol | 0.70% Triton | 5% 2098 | 5% M | PVA | Sorbitol | Triton | 2098 | M | Total q | Comments: diluted each sample with 20 mL tap water and only 10 strokes | slippery |
|---|---|---|---|---|---|---|---|---|---|---|---|---|---|---|
| 17 | | 18.0 | 0 | 0 | 1.2 | 25.2 | 0.83 | 0.00 | 0.00 | 0.06 | 1.26 | 1.950 | similar to 18 but slightly tougher | |
| 18 | | 17.4 | 0 | 0 | 1.8 | 25.0 | 0.51 | 0.00 | 0.00 | 0.09 | 1.25 | 1.949 | same as 13 | med |
| 19 | | 34.0 | 14 | 0 | 1.2 | 0.0 | 1.19 | 0.70 | 0.00 | 0.06 | 0.00 | 1.950 | same 11 | most |
| 20 | | 13.2 | 0 | 0 | 1.6 | 27.9 | 0.46 | 0.00 | 0.00 | 0.09 | 1.40 | 1.947 | easy to shear off - low film - more shatter I like this one too. | med |
| | | | | | | | | | | | | | Comments: diluted each sample with 20 mL of tap water and only 10 strokes | slippery |
| 21 | | 14.5 | 7 | 0 | 1.8 | 20.0 | 0.51 | 0.35 | 0.00 | 0.09 | 1.00 | 1.945 | easy to shear off - med/low film - more shatter | med |
| 22 | | 26.8 | 0 | 0 | 1.8 | 18.5 | 0.93 | 0.00 | 0.00 | 0.00 | 0.99 | 1.946 | easy to shear off - med/low film - more shatter I like this one too | med |
| 23 | | 34.0 | 14 | 0 | 1.2 | 0.0 | 1.19 | 0.70 | 0.00 | 0.06 | 0.00 | 1.950 | same 11 | most |
| 24 | | 13.1 | 5 | 0 | 1.8 | 23.0 | 0.45 | 0.25 | 0.00 | 0.09 | 1.15 | 1.949 | easy to shear off - med/low film - more shatter | med |

| Test no | Move no | 0.0 PVA | 5.00% Sorbitol | 0.70% Triton | 5% 2098 | 5% M | PVA | Sorbitol | Triton | 2098 | M | Total q | Comments: diluted each sample with 20 mL tap water and only 10 strokes | slippery |
|---|---|---|---|---|---|---|---|---|---|---|---|---|---|---|
| 25 | | 0.0 | 14 | 0 | 1.2 | 23.8 | 0.00 | 0.70 | 0.00 | 0.06 | 1.19 | 1950 | Coating seemed to evaporate no coating could be scraped | low |
| 26 | | 7.8 | 10 | 0 | 1.2 | 22.3 | 0.27 | 0.50 | 0.00 | 0.06 | 1.12 | 1948 | coating was very thin and gummy - yuk no coating could be scaped | low |
| 27 | | 34.0 | 14 | 0 | 1.2 | 0.0 | 1.19 | 0.70 | 0.00 | 0.06 | 0.00 | 1.950 | same 11 | most |
| 28 | | 3.6 | 12 | 0 | 1.2 | 0.0 | 1.19 | 0.70 | 0.00 | 0.06 | 0.00 | 1.951 | coating seemed to evaporate no coating could be scraped | low |
| 29 | | 13.2 | 0 | 0 | 1.8 | 27.9 | 0.45 | 0.00 | 0.00 | 0.09 | 1.40 | 1.947 | thin Film - I like this one - not as hard of a coating and film starts to shatter when dry | med |
| 30 | | 17.4 | 0 | 0 | 1.8 | 25.0 | 0.81 | 0.00 | 0.00 | 0.99 | 1.25 | 1.949 | thin/med Film - I like this one - not as hard of a coating and film starts to shatter when dry | med |
| 31 | | 34.0 | 14 | 0 | 1.2 | 0.0 | 1.19 | 0.70 | 0.00 | 0.06 | 0.00 | 1.950 | same 11 | med |
| 32 | | 26.6 | 0 | 0 | 1.8 | 18.5 | 0.93 | 0.00 | 0.00 | 0.09 | 0.93 | 1.946 | med Film - I like this one not as hard of a coating and film starts to shatter when dry | med |

Then I stuck a piece of bifold toweling to the hot plate with the current mill coating Vs. the no. 32 test sample. The incumbent reacted like the sample testing - the paper was stuck loosely to the metal with a soft, stringy, binding. Our no. 32 program stuck the sheet much more evenly and harder to the dryer and I had trouble scraping some of the sheet off.

It will be apparent to those skilled in the art that various modifications and variations can be made to the embodiments of the present invention without departing from the spirit or scope of the present invention. Thus, it is intended that the present invention cover other modifications and variations of this invention within the scope of the appended claims and their equivalents.

What is claimed is:

1. A process for manufacturing a creped fiber web, comprising:
    providing a rotating cylindrical dryer including an adhesive dryer surface, said adhesive dryer surface comprising an ionene polymer adhesive, wherein said ionene polymer adhesive comprises a crosslinked polymer of an alkylamine, a haloepoxyalkane, and an amine that differs from said alkylamine;
    conveying a fiber web to said adhesive dryer surface;
    drying the fiber web on said adhesive dryer surface to form a dried fiber web; and
    creping the dried fiber web from said adhesive dryer surface.

2. The process of claim 1, wherein said ionene polymer adhesive comprises a terpolymer of dimethylamine, epichlorohydrin, and ethylenediamine.

3. The process of claim 2, wherein said adhesive further comprises monoammonium phosphate.

4. The process of claim 3, wherein said monoammonium phosphate is present in an amount of up to about 10% by weight based on the solids weight of said adhesive.

5. The method of claim 3, wherein said monoammonium phosphate is present in an amount of about 1% by weight based on the solids weight of said ionene polymer.

6. The process of claim 1, wherein said adhesive comprises at least about 30% by weight said ionene polymer, up to about 60% by weight said ionene polymer, at least about 40% by weight water, and up to about 70% by weight water.

7. The process of claim 6, wherein said adhesive comprises at least about 40% by weight said ionene polymer, up to about 50% by weight said ionene polymer, at least about 50% by weight water, and up to about 60% by weight water.

8. The process of claim 1, wherein said polymer comprises at least about 20% by weight and up to about 40% by weight polyalkylamine units, at least about 55% by weight and up to about 75% by weight haloepoxyalkane units, and at least about 1% by weight and up to about 10% by weight alkylenepolyamine units.

9. The process of claim 1, wherein said alkylamine comprises dimethylamine.

10. The process of claim 1, wherein said haloepoxyalkane comprises epichlorohydrin.

11. The process of claim 1, wherein said amine that differs from said alkylamine comprises ethylenediamine.

12. The process of claim 1, further including:
drying said fiber web to a fiber consistency of at least about 10% and up to about 90% before conveying said fiber web to said adhesive dryer surface.

13. The process of claim 1, further including:
drying said fiber web to a fiber consistency of at least about 40% by weight and up to about 50% by weight before conveying said fiber web to said adhesive dryer surface.

14. The process of claim 1, wherein said drying to form a dried fiber web comprises drying the fiber web to a fiber consistency of at least about 95% by weight prior to creping the dried fiber web from said adhesive dryer surface.

15. The process of claim 1, wherein said conveying comprises carrying the fiber web on a fabric to said rotating cylindrical dryer surface and transferring the fiber web from the fabric to the dryer surface.

16. The process of claim 15, wherein the fabric which carries the web to the rotating cylindrical dryer surface is a transfer and impression fabric having knuckles which compact a minor percentage portion of the surface of the web on the creping dryer and the adhesive retains the knuckled web on the dryer surface until the fiber consistency of the web is at least about 95%.

17. The process of claim 16, wherein the impression fabric knuckles compact about 20% of the surface area of the web on said dryer surface.

* * * * *